(No Model.)

J. HEARNE & E. E. CISCO.
MACHINE FOR TAPPING MAINS.

No. 554,513.  Patented Feb. 11, 1896.

WITNESSES:
H. Walker

INVENTORS
J. Hearne
E. E. Cisco
BY Munn & Co.
ATTORNEYS.

UNITED STATES PATENT OFFICE.

JOHN HEARNE, OF NEW YORK, AND ELMER E. CISCO, OF BROOKLYN, NEW YORK.

MACHINE FOR TAPPING MAINS.

SPECIFICATION forming part of Letters Patent No. 554,513, dated February 11, 1896.

Application filed August 23, 1895. Serial No. 560,277. (No model.)

*To all whom it may concern:*

Be it known that we, JOHN HEARNE, of New York city, in the county of New York, and ELMER E. CISCO, of Brooklyn, in the county of Kings, State of New York, have invented a new and Improved Machine for Tapping Mains, of which the following is a full, clear, and exact description.

Our invention relates to a machine for tapping water, gas, and oil mains, and it has for its object to provide a machine adapted to be fastened upon a pipe, and so constructed that a hole may be drilled, reamed and tapped in a pipe and a cock introduced into the pipe without loss of fluid from the pipe itself, and also without danger of asphyxiation; and a further object of the invention is to so construct the machine that the tool may be removed from the pipe without the escape of fluid and another tool introduced.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1:
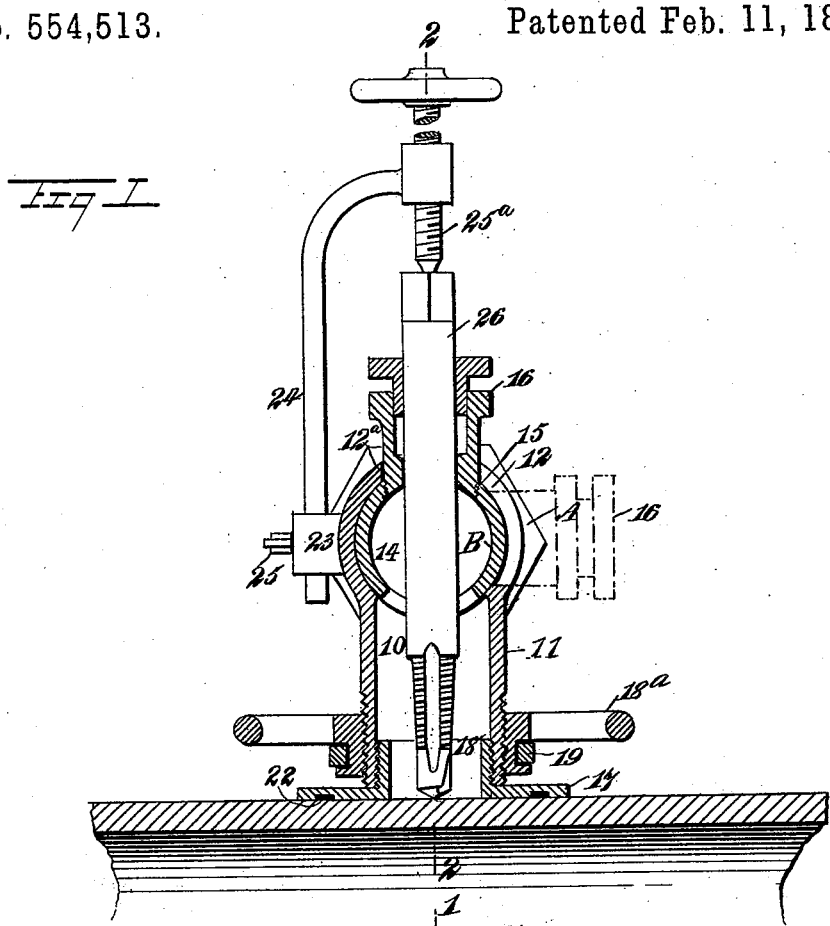
Figure 2:
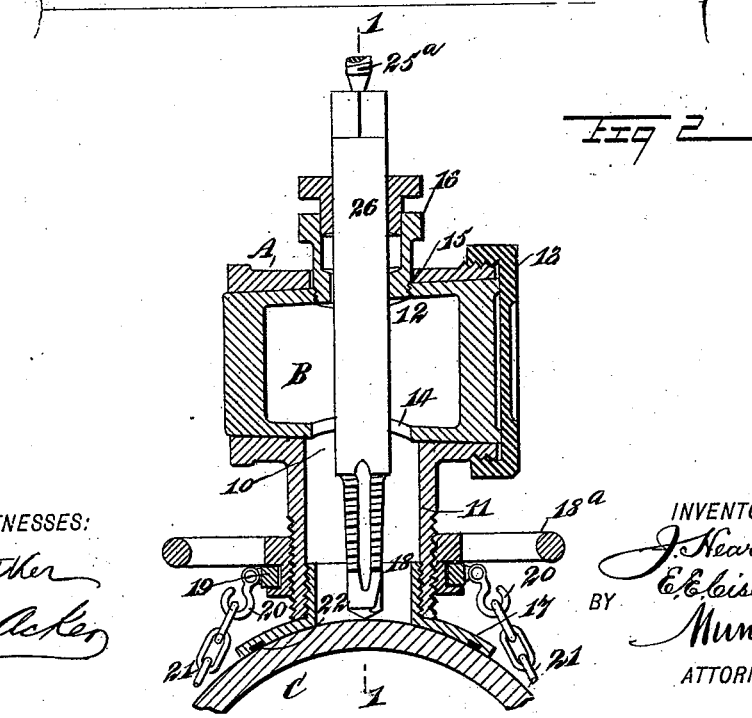

Figure 1 is a vertical section through the machine, taken substantially on the line 1 1 of Fig. 2; and Fig. 2 is a section taken at a right angle to that shown in Fig. 1, and practically on the line 2 2 of the said figure.

In carrying out the invention a barrel A is provided having a tapering interior, and a conical plug B is held to turn in the said barrel, the said plug being preferably tubular; and the barrel is provided with an opening 10 in its lower face, preferably surrounded by an interiorly and exteriorly threaded tube 11, while in the upper portion of the barrel a circumferential opening 12 is made, which extends from one side of the center well down upon one side, as shown particularly in Fig. 1. The plug is held in proper frictional contact with the barrel preferably through the instrumentality of a cap 13, which is screwed upon the end of the barrel and arranged to bear against the larger end of the plug, as illustrated in Fig. 2. The plug is provided with an opening 14 in its bottom portion, registering with the opening 10 in the bottom of the barrel and with an opening 15 in the top, in which a suitably-packed box or bearing 16 is introduced. A saddle 17 is likewise provided, and the said saddle is shaped to fit upon the exterior of a pipe C to be tapped, being provided with an exteriorly-threaded collar 18, screwed into the tube 11 of the barrel. A hand-wheel $18^a$ is screwed upon the exterior threads of the tube 11, and the hub of the said wheel is provided with an annular groove in which a preferably two-piece ring 19 is loosely mounted; and at opposite sides of the said ring a hook 20 is secured, adapted to receive the ends of a chain 21 when said chain has been passed around the pipe, and by the manipulation of the aforesaid wheel the chain is made to clamp the saddle closely on the pipe. The said saddle is provided with a packing 22 upon its under face so as to make a fluid-tight connection with the aforesaid pipe.

At one side of the barrel a sleeve 23 is located, through which a standard 24 is passed, being held in vertical adjustment by a set-screw 25, or its equivalent; and the said device is carried upward over the bearing 16 of the plug and provided with an adjustable feed-screw $25^a$.

The reamer or drill or other tool 26 adapted to make an opening in the pipe is introduced into the box or bearing 16, in which it is fitted quite tightly, yet is free to revolve, and the plug B is turned so as to cause its bearing 16 to abut against the upper end $12^a$ of the slot or opening 12 in the barrel A, which upper end $12^a$ forms a stop or shoulder to limit the movement of the plug, so that the tool will be steadied while being used and will be properly guided into position. The tool is then carried downward through the bottom outlet in the plug and in the barrel and down through the sleeve in the saddle to an engagement with the pipe. The tool is then revolved in any suitable manner, being fed downward as revolved by the center $25^a$, and after the necessary hole in the pipe has been made the tool is withdrawn from the hole in the pipe and the plug is turned, the bearing or box 16, together with the tool, moving in the slot 12 in the side of the barrel, and when the plug has been thus moved its outlet will be shut off by being brought in registry with the inner side surface of the barrel. The tool may then be removed without danger of any fluid escaping, and another tool may be introduced carrying the regulation cock or stop, if desired, and the plug is then revolved back to its original position and the tool manipulated to screw the cock or stop into the opening made to receive it in the pipe.

The stop formed by the upper end 12ª of the slot 12 in barrel A is so located that by it the plug is always stopped in the same position, so that when the cock is inserted after the hole has been tapped, and the plug is again turned to an erect position, said cock will be held exactly in the same position as was the drill, whereby it may be readily screwed into the opening in the main. Moreover, the standard 24 is arranged behind said stop formed by the upper end 12ª of the slot 12, so that a workman may operate the drill from the side of the device opposite to the standard without danger of moving the plug so as to displace or break the drill while the hole is being tapped, the lateral pressure being received by the upper end 12ª of the slot 12.

The device is exceedingly simple, durable and economic, and may be expeditiously fitted to cut pipe, and through its means a tapping of the pipe may be effected and the tap closed without danger of loss of fluid even to the slightest degree.

Having thus described our invention, we claim as new and desire to secure by Letters Patent—

In a tapping-machine, the combination of a tube having means for securing it to a pipe to be tapped, a barrel formed transversely on the tube at the upper end thereof, said barrel having a cylindrical opening formed transversely across the opening in the tube, a plug having closed ends arranged to turn in said cylindrical opening in the barrel and having its walls fitting the walls of the barrel in a substantially water-tight manner, said barrel having a slot formed part way around it, said slot extending from the upper part of the barrel down one side thereof, and a box projecting from the side of the plug through the slot in the barrel, said box and plug being provided with an opening extending through them and adapted for the passage of a tool to tap the pipe, the upper edge of the slot in the barrel being arranged to engage the box projecting through it and stop the turning of the plug when the tool carried by the plug is in position to be passed through the tube into engagement with the pipe to be tapped, substantially as set forth.

JOHN HEARNE.
ELMER E. CISCO.

Witnesses:
PAUL E. MITCHELL,
EDWARD HOPPER.